(12) United States Patent
French

(10) Patent No.: US 6,641,476 B2  
(45) Date of Patent: Nov. 4, 2003

(54) CURRENCY UNIT DISPENSING APPARATUS

(76) Inventor: Colin Richard French, 63 Honeysuckle Close, Badger Farm, Winchester, Hampshire, SO22 4QQ (GB)

( * ) Notice: Subject to any disclaimer, the term of this patent is extended or adjusted under 35 U.S.C. 154(b) by 0 days.

(21) Appl. No.: 10/034,737

(22) Filed: Dec. 28, 2001

(65) Prior Publication Data

US 2002/0117798 A1 Aug. 29, 2002

(30) Foreign Application Priority Data

Dec. 28, 2000 (EP) .............................. 00311735

(51) Int. Cl.⁷ .................. G07D 1/00; F16D 15/00
(52) U.S. Cl. .................. 453/21; 453/41; 453/43; 310/97; 192/41 R; 192/45
(58) Field of Search .................. 453/21, 18, 19, 453/41; 221/273, 272; 209/534; 310/92, 94, 97, 103, 105; 192/40, 41 R, 44, 45, 45.1, 48.2, 53.1, 53.2, 53.3, 53.31

(56) References Cited

U.S. PATENT DOCUMENTS

| | | | |
|---|---|---|---|
| 2,061,787 A | * 11/1936 | Warner | 192/40 |
| 2,555,215 A | 5/1951 | Warner | 192/35 |
| 2,578,716 A | * 12/1951 | Oetzel | 192/40 |
| 2,843,237 A | * 7/1958 | Carr | 192/40 |
| 2,919,000 A | * 12/1959 | Claytor | 192/84.8 |
| 3,680,673 A | * 8/1972 | Webb | 192/41 R |
| 4,284,093 A | * 8/1981 | Hayashi | 453/21 |
| 5,605,201 A | 2/1997 | McGinn et al. | 180/233 |
| 5,616,075 A | * 4/1997 | Winstanley et al. | 453/41 |
| 5,810,141 A | * 9/1998 | Organek et al. | 192/35 |
| RE36,502 E | * 1/2000 | Organek et al. | 192/35 |

FOREIGN PATENT DOCUMENTS

JP  4-31587 A  * 11/1992  ............. G07D/1/00

* cited by examiner

*Primary Examiner*—Donald P. Walsh  
*Assistant Examiner*—Mark J. Beauchaine  
(74) *Attorney, Agent, or Firm*—Fish & Richardson P.C.

(57) ABSTRACT

A coin (or banknote) dispenser has a plurality of cash stores, a common actuator and a clutch for each store selectively transmitting a driving force to cause dispensing of a currency unit. The clutch has a driving member which is driven by the actuator, a driven member which can move to cause a currency unit to be dispensed from the cash store, a coupling member which can cause a driving force to be transmitted from the driving member to the driven member depending upon whether the coupling member is in an engaged state or a disengaged state, and an electromagnet for moving the coupling member from one of the states to the other state.

17 Claims, 10 Drawing Sheets

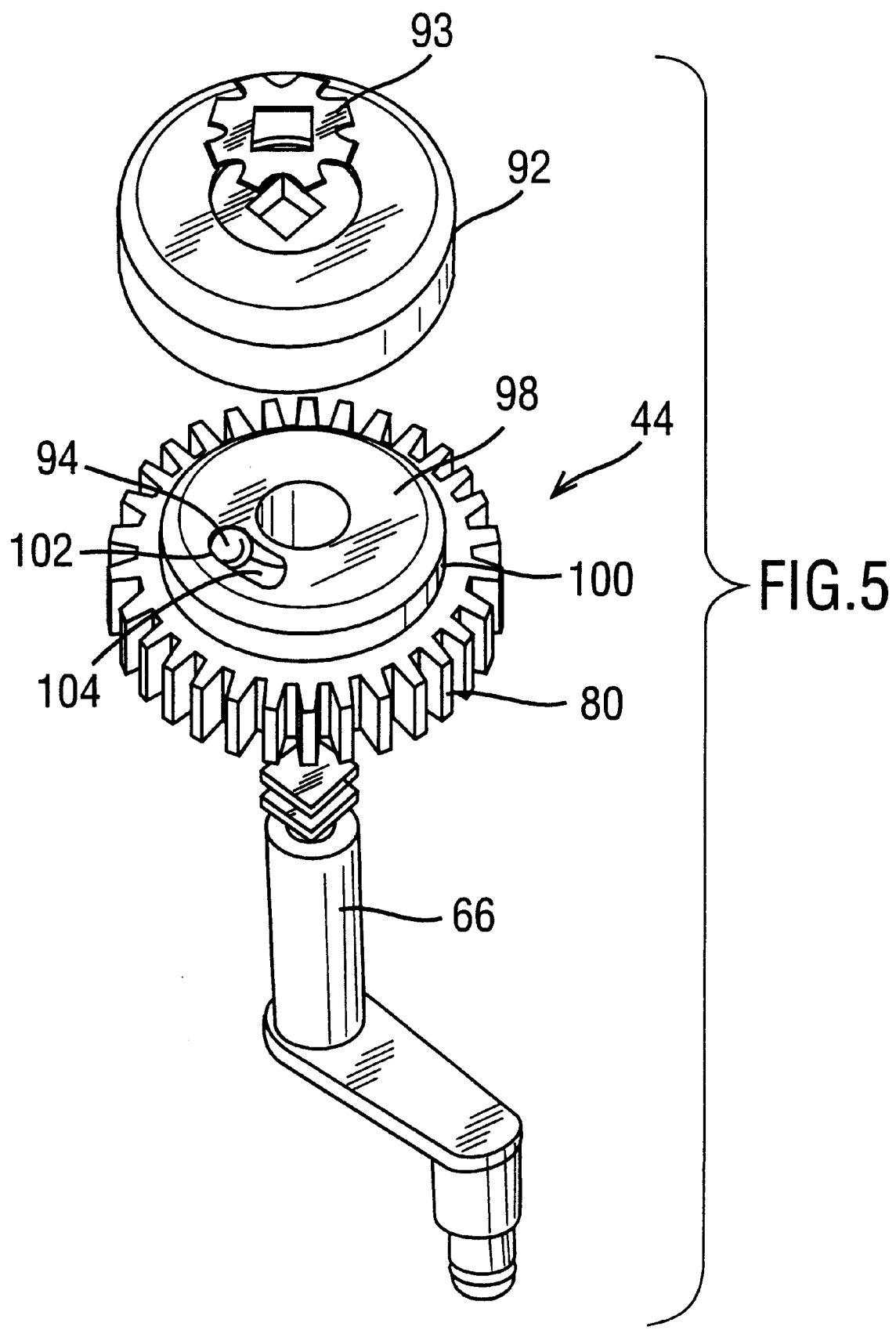

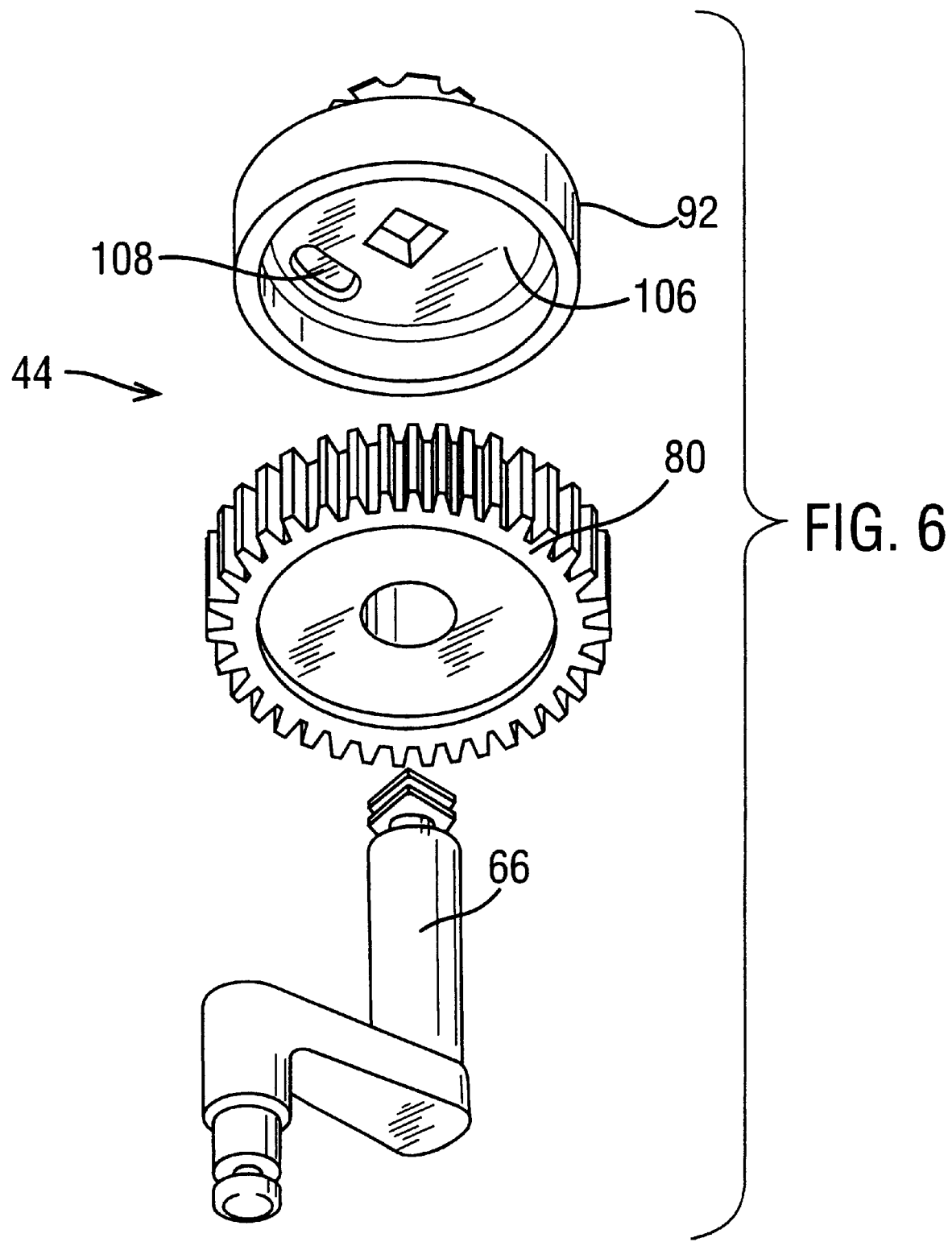

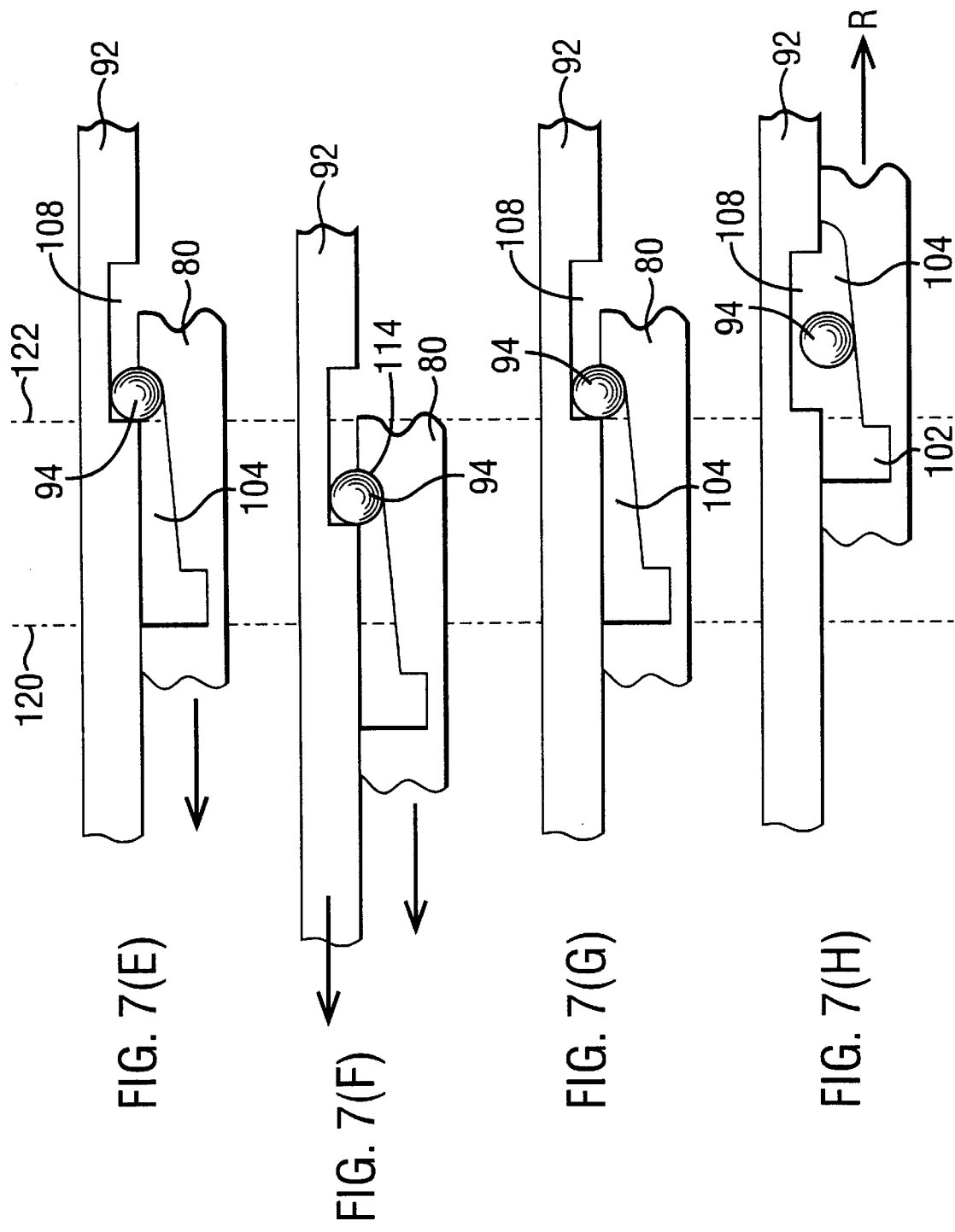

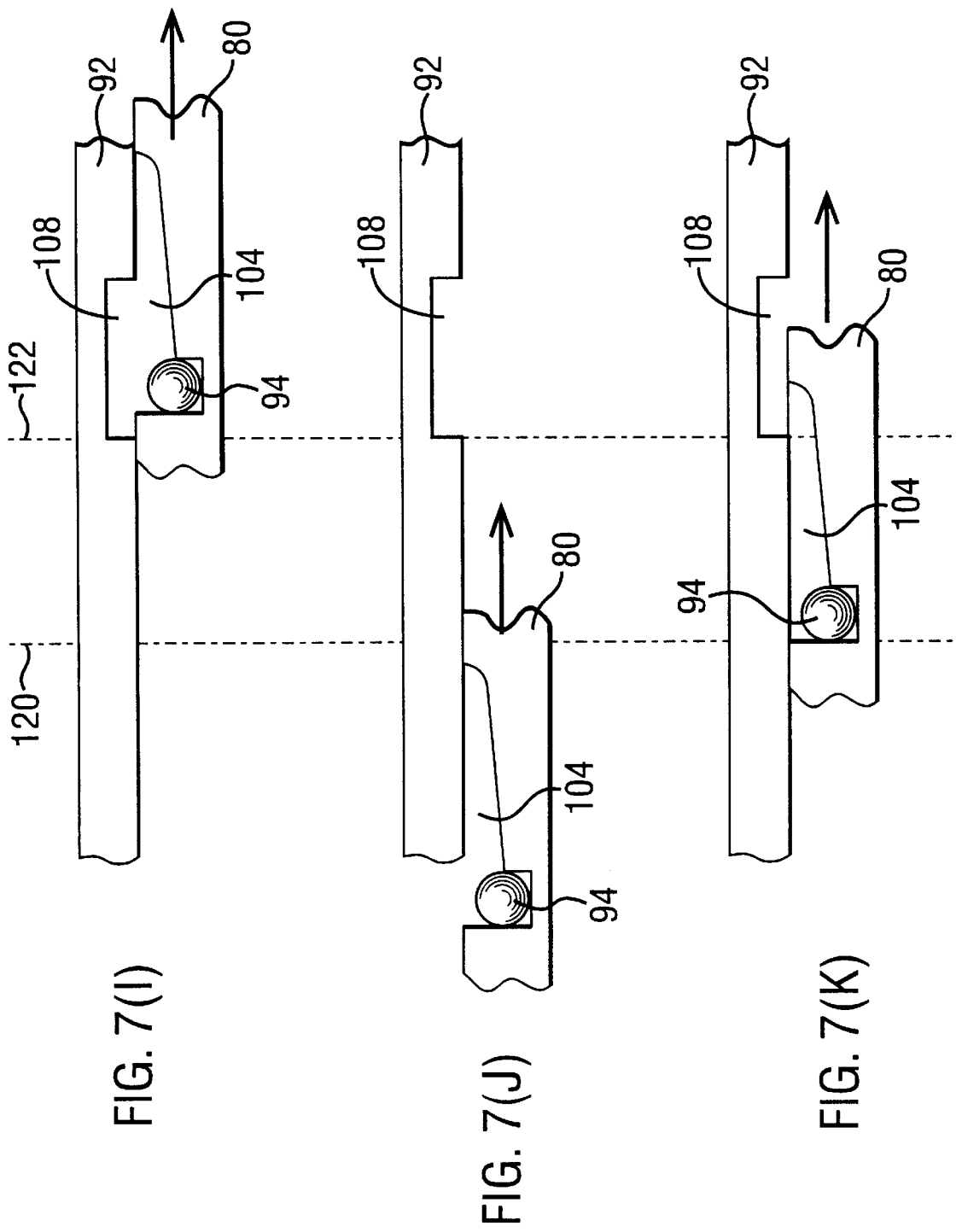

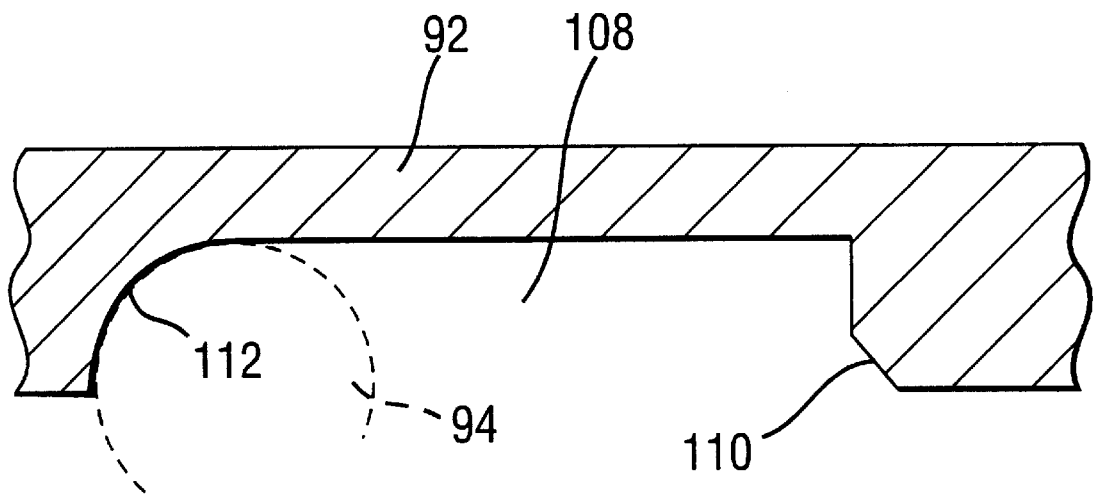

CURRENCY UNIT DISPENSING APPARATUS

This invention relates to apparatus for dispensing units of currency. The invention will be described in the context of a coin dispenser, but the techniques could also be applied to the dispensing of banknotes.

Various types of devices are known for dispensing coins, for example in change-giving apparatus. Coins are commonly stored in tubes within each of which coins of a respective denomination are stacked face-to-face. The coins are usually dispensed by sliding the bottom-most coin laterally out of the stack.

It is also known to provide an actuator, in the form of a motor, which can be used to dispense coins selectively from two separate stores, using clutch arrangements. See for example WO 94/16411.

It would be desirable to provide an improved arrangement for dispensing coins, incorporating an inexpensive, low-power and compact drive mechanism.

Aspects of the present invention are set out in the accompanying claims.

In one aspect of the present invention, a clutch for selectively causing a dispensing operation to be performed in response to movement produced by an actuator comprises an electromagnet which can move a coupling member between a disengaged state and an engaged state. Preferably, the coupling member is moved towards the engaged state by the electromagnet, and is moved back to the disengaged state under the influence of gravity and/or by reversing the direction in which the clutch is driven (although if desired the various influences could have the opposite effects).

Preferably, the clutch has a driving member and a driven member which can adopt different relative positions, the coupling member in its engaged state limiting relative movement between the driving and driven members so that the driving member drives the driven member. It is envisaged that that driving and driven members would be arranged to rotate, preferably around a common axis, as this leads to a particularly compact arrangement. However, other arrangements are possible, such as having one or both of the members arranged for linear reciprocation.

The arrangement is preferably such that the coupling member is prevented from moving into its disengaged state in one relative position and/or its engaged state in another relative position. This would mean that the electromagnet would need to be operated only for a fairly brief time to cause clutch engagement (or possibly disengagement), therefore lowering the overall power consumption.

Preferably, with the coupling member in its engaged state, the driving member and driven member move relative to each other over a limited range, the coupling member transmitting the driving force to the driven member at one limit of the range and the coupling member being capable of shifting to its disengaged state of the other limit of the range. In between these limits, the coupling member is retained in its engaged state but is confined in the direction between the two states by an amount which progressively increases as the driving limit position is reached. This can be achieved by providing a ramp on one or both of the driving and driven members. Such an arrangement can have several advantages: (a) the coupling member can more readily enter its engaged state, (b) the relative freedom of movement of the coupling member means that interference between the driving and driven members can be avoided until the driving limit position is closely approached, without requiring precise tolerances in the dimensions of the clutch elements, and (c) the coupling member will more readily shift to its disengaged state when this is required.

Preferably, the coupling member is capable of rolling motion (for example it may be a roller or preferably a sphere) to assist in moving between its engaged and disengaged states and to reduce the chances of the coupling member sticking.

A clutch in accordance with the present invention can be made inexpensively and can be compact. Preferably, a single actuator, such as a motor, is used to drive a plurality of clutches each associated with a respective coin store. Preferably, there are three or more such clutches and coin stores. This means that fewer actuators are required than in many prior art arrangements, thus resulting in a less expensive and more compact arrangement, and also permitting the use of a larger and thus more powerful actuator. Depending upon the power of the chosen actuator, the arrangement may be such that the actuator can simultaneously dispense from a plurality of stores.

An arrangement embodying the invention will now be described by way of example with reference to the accompanying drawings, in which:

FIGS. 5 and 6 are exploded views from, respectively, above and below of the clutch;

FIGS. 7(A) to (K) are explanatory diagrams to illustrate the operation of the clutch; and FIG. 8 is a close-up view of part of a driven member of the clutch.

Figure 1:
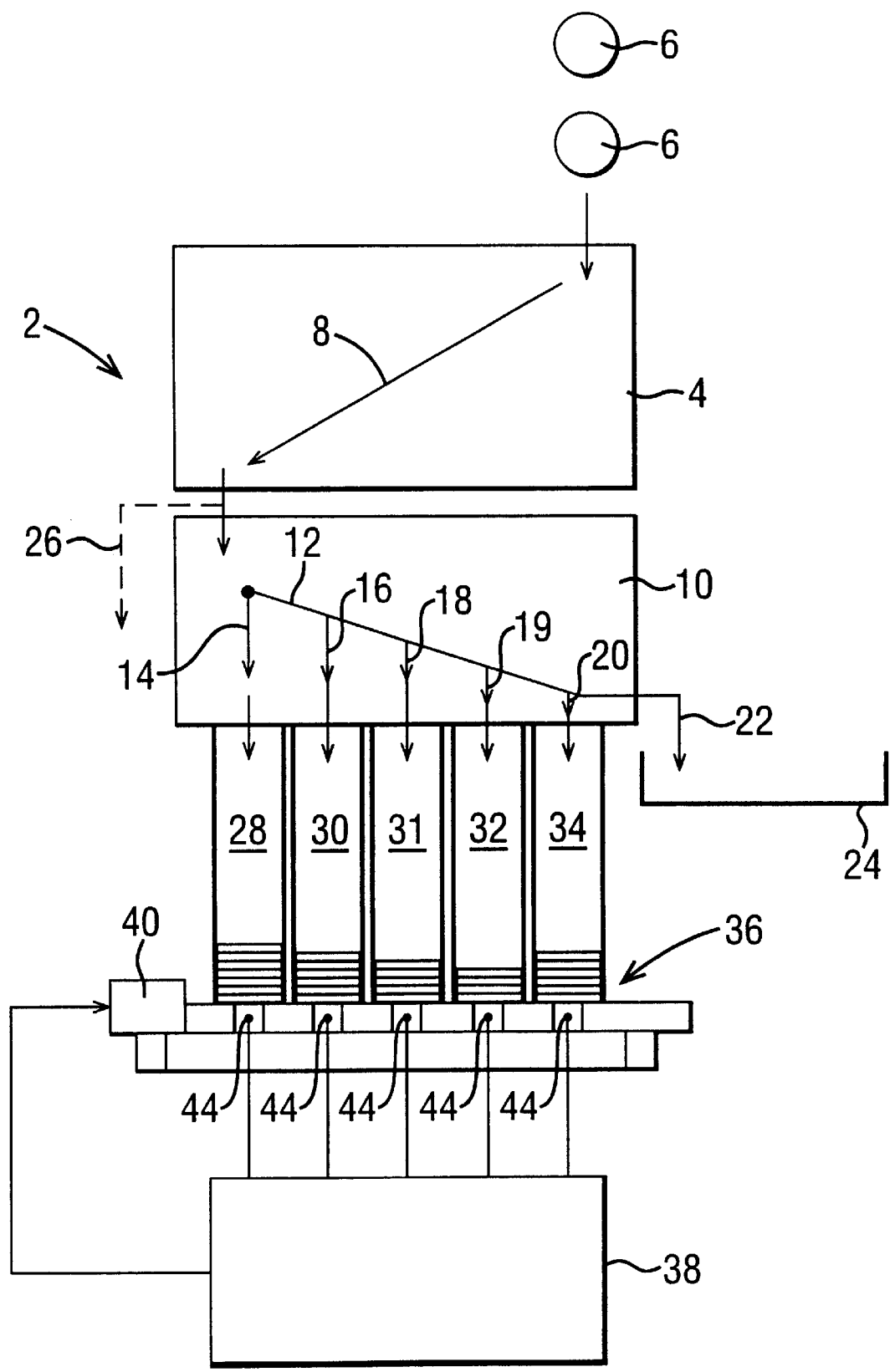
FIG. 1 is a schematic view of a coin handling apparatus including a coin dispensing apparatus according to the present invention.

Referring to FIG. 1, the coin handling apparatus 2 includes a coin validator 4 for receiving coins as indicated at 6. During the passage of the coins 6 along a path 8 in the validator 4, the validator provides signals indicating whether the coins are acceptable, and if so the denomination of the coins.

Acceptable coins then enter a coin separator 10, which has a number of gates (not shown) controlled by the circuitry of the apparatus for selectively diverting the coins from a main path 12 into any of a number of further paths 14, 16, 18, 19 and 20, or allowing the coins to proceed along the path 12 to a path 22 leading to a cashbox 24. If the coins are unacceptable, instead of entering the separator 10 they are led straight to a reject slot via a path 26.

Each of the paths 14, 16, 18, 19 and 20 leads to a respective one of five coin tubes or containers 28, 30, 31, 32 and 34. Each of these containers is arranged to store a vertical stack of coins of a particular denomination. Although five containers are shown, any number may be provided.

A dispenser indicated schematically at 36 is operable to dispense coins from the containers when change is to be given by the apparatus. The dispenser 36 comprises a control means 38 which is arranged to drive a motor 40. As will be explained below, rotation of the shaft of the motor 40 causes a coin to be dispensed from a selected one of the containers 28, 30, 31, 32 and 34. The control means 38 can select a container by operating a respective one of a plurality of clutches, schematically shown at 44, each associated with a respective one of the containers.

Figure 2:
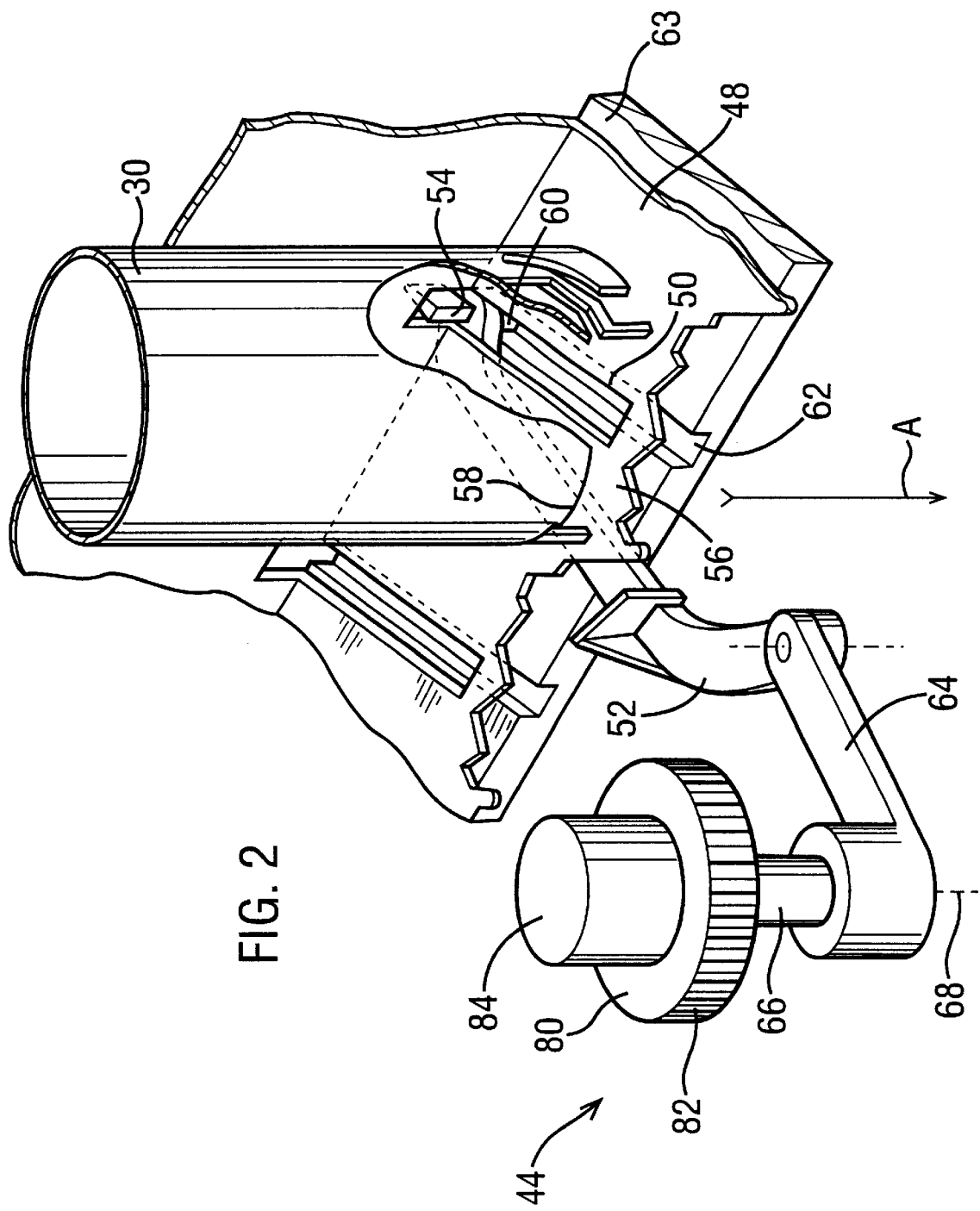
FIG. 2 is a schematic perspective view for explaining how coins are dispensed from a coin store of the dispensing apparatus.

Referring to FIG. 2, this illustrates how a coin is dispensed, and for purposes of clarity shows the lower end of only one of the containers, 30. The containers are open at the bottom so that each stack of coins rests on a bottom surface 48 extending underneath the containers. This bottom surface 48 is formed with a narrow slot 50 underneath each container.

A dispensing arm or member 52 extends underneath the bottom surface 48 and has a coin-pushing extension 54 which projects upwardly from one end of the member 52 and which projects through the slot 50. As will be described below, the arm 52 can be moved substantially in the direction of its length, which will cause the projection 54 to move along the slot 50 from the rear of the container 30, engaging the edge of the lowermost coin in the container, so that this coin is pushed out of the container through a space 56 between the lower front edge 58 of the container 30 and the bottom surface 48. The coin will thus be allowed to fall from the dispensing apparatus in the direction of arrow A. The dispensing arm 52 has a guiding extension 60 projecting downwardly from the end of the member 52 and located in a recess 62 provided in a base member 63 situated beneath the surface 48 so as more accurately to guide the movement of the member 52.

The end of the dispensing arm 52 opposite the extension 54 is pivotably mounted to a crank arm 64, which is mounted on a shaft 66 for rotation about an axis 68. A single rotation of the shaft 66 will move the crank arm 64 from the position shown in FIG. 2, wherein the dispensing arm 52 is in its home position, in such a way that the dispensing arm is pulled forwardly along the length of the slot 50, and then pushed backwardly along the slot to the home position. This constitutes a single dispensing cycle.

The crank arm 64 and shaft 66 schematically shown in FIG. 2 form part of a clutch 44 which has a driving member 80 in the form of a circular driving wheel with gear teeth 82 around its periphery. The motor 40 is arranged to rotate the driving wheel 80, and this rotational movement is transmitted to the shaft 66 if the clutch 44 is engaged. Engagement of the clutch can be achieved by operating an electromagnet 84.

Figure 3:
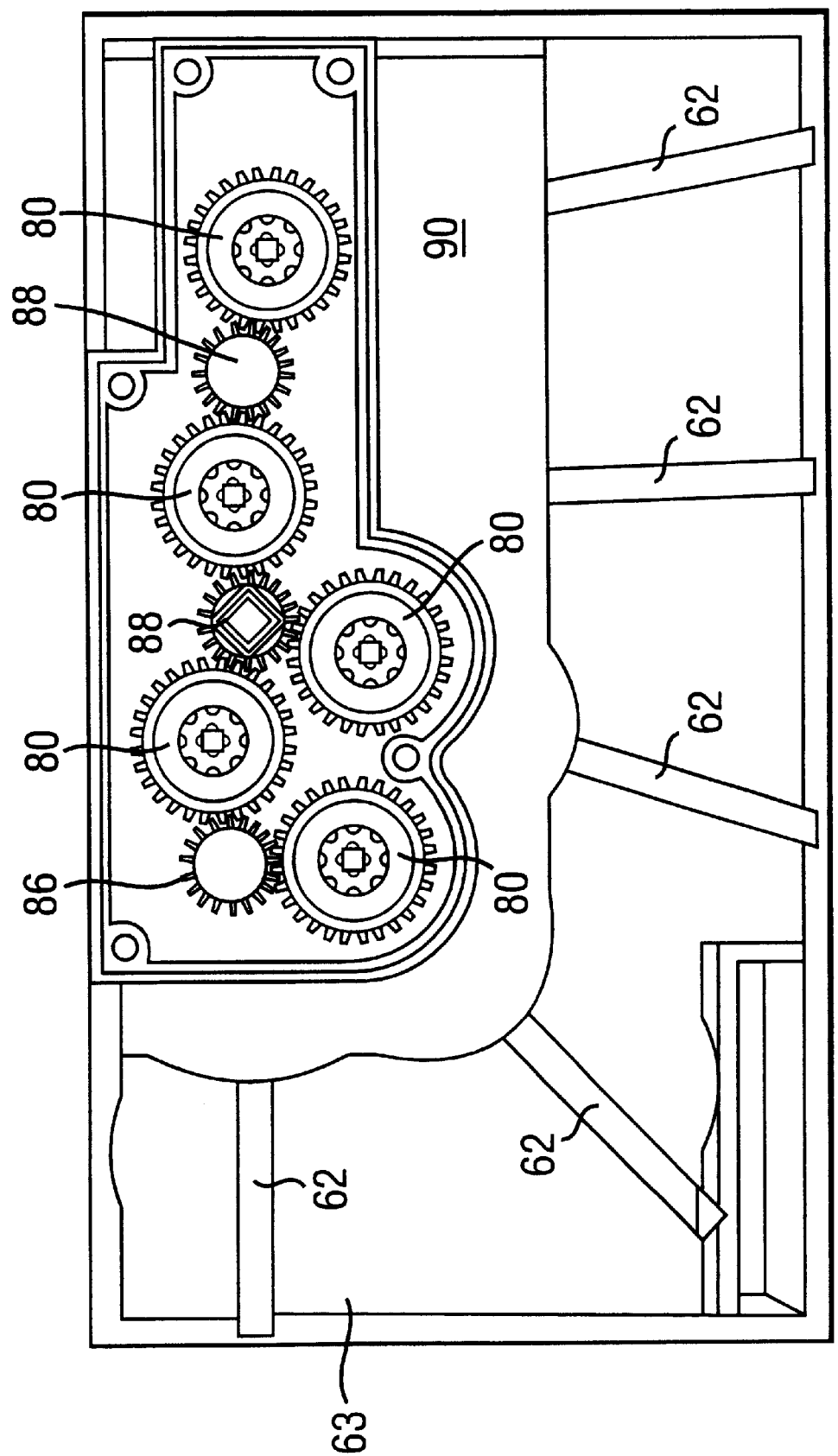
FIG. 3 is a plan view of a part of the dispensing apparatus including a number of clutches thereof.

Referring to FIG. 3, the driving wheels 80 of the five clutches 44 are all drivingly inter-engaged via a driving gear 86 and idler gears 88. Accordingly, all five driving wheels 80 are rotated when the motor 40 is caused to drive the driving gear 86. Depending upon which clutch 44 is engaged, a coin will be dispensed from one of the containers into a dispense area 90.

Figure 4:
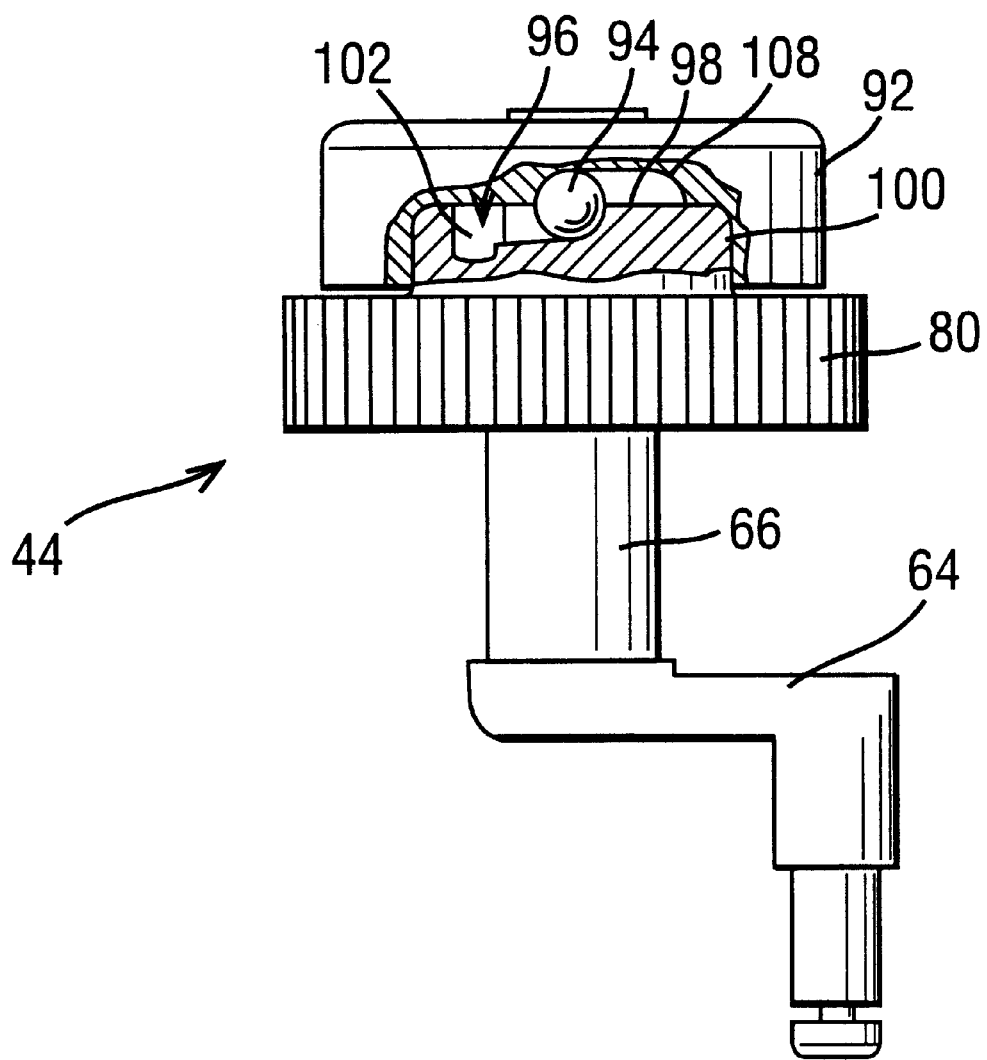
FIG. 4 is a side view, partially cut-away, of one of the clutches.

Referring to FIGS. 4 to 6, in each clutch 44, the driving wheel 80 supports a driven cap 92 which is non-rotatingly mounted on the top of the shaft 66 and retained by a clip 93. A coupling member, in the form of a ferrous steel ball 94, is located in a recess 96 in an upper surface 98 of an axially-projecting extension 100 of the driving wheel 80. The recess 96 is formed of two main parts, a pocket 102 and a channel 104.

The pocket 102 is deep enough so that, when the ball 94 is located therein, the ball does not project above the upper surface 98. In this condition, which is the disengaged condition of the clutch, the rotation of the wheel 80 does not cause a rotation of the cap 92, which fits over the extension 100.

The overlying cap 92 has, in its downwardly-facing surface 106, an upper ball channel 108. Assuming that this channel 108 is located over the pocket 102, then the ball 94 is free to move upwardly into the upper channel 108, where it bridges the driving wheel 80 and the cap 92 and thus limits relative rotation therebetween.

Assuming that the driving wheel 80 is then rotated to the left as shown in FIG. 4, the ball 94 will become trapped between the left edge of the upper ball channel 108 and a right edge of the lower ball channel 104, any further rotation of the driving wheel 80 thus causing corresponding rotation of the cap 92 and thus the shaft 66.

The operation of the clutch 44 will now be described with reference to FIG. 7, in which for purposes of clarity parts of the driving wheel 80 and the driven cap 92 are illustrated in schematic form, with the rotational movement thereof represented as a linear movement.

Figures 7A, 7B, 7C, 7D:
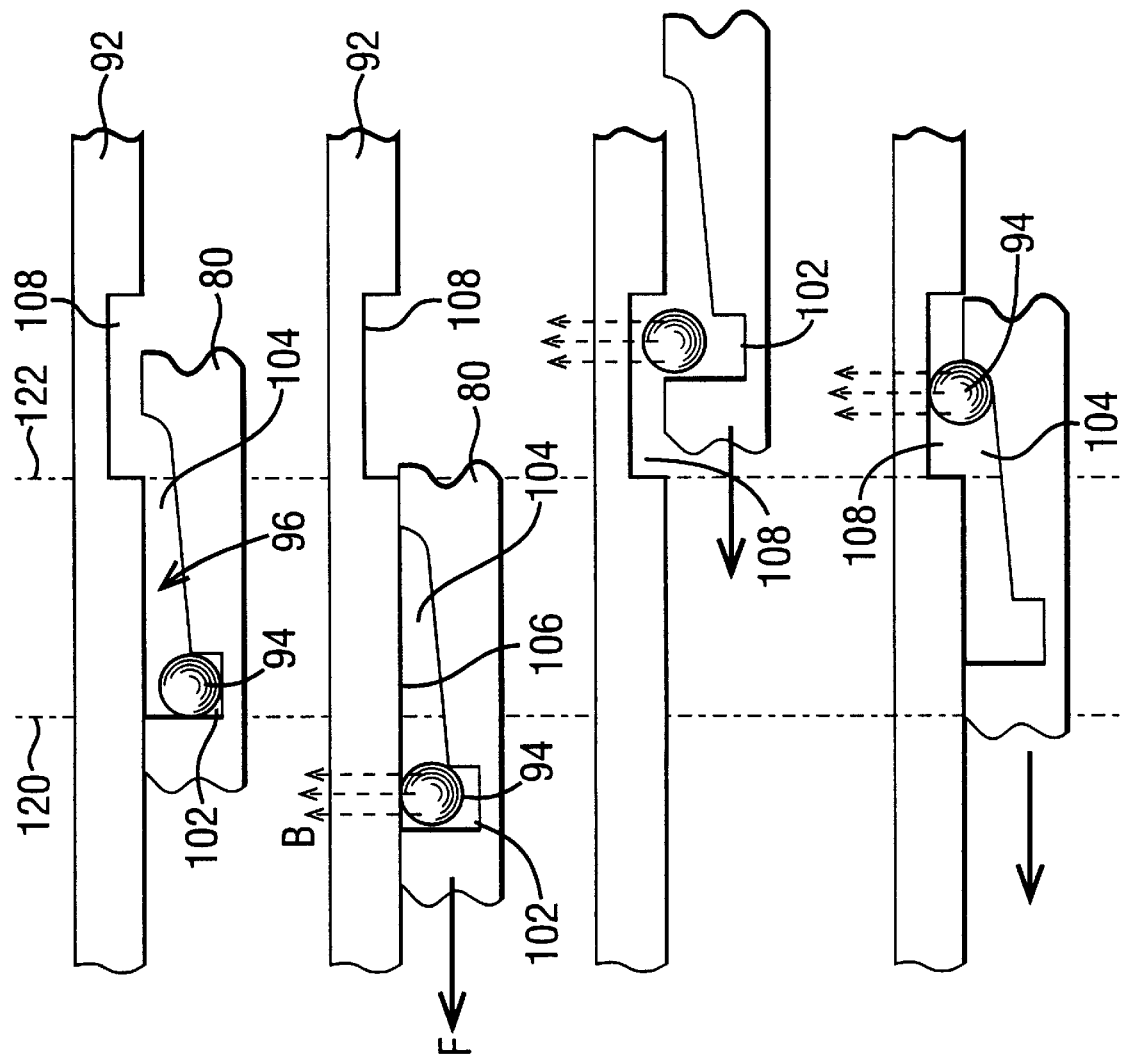

Referring to FIG. 7(A), this represents the positions of the driving wheel 80 and the driven cap 92 in the rest position, with the output shaft of the motor 40 in its home position. The line 120 represents the home position of the left edge of the recess 96 and the line 122 represents the rest position of the left edge of the upper ball recess 108 in the cap 92. FIG. 7(A) shows the ball 94 in its disengaged state, within the pocket 102 of the recess 96.

In order to dispense a coin, the motor 40 is arranged to drive the driving wheel 80 in the direction of arrow F in FIG. 7(B). The electromagnet 84 is operated to attract the ball 94, which rises in the direction of arrows B. However, the underside 106 of the cap 92 prevents the ball from leaving the pocket 102 until the driving wheel 80 has almost completed a full rotation, at FIG. 7(C). At this point, when the upper ball channel 108 overlies the pocket 102, the ball 94 is free to leave the pocket. Further rotation (see FIG. 7(D)) results in the ball 94 being partially located in the upper ball channel 108 and partially in the lower ball channel 104. If necessary, the ball 94 is pushed into the channel 104 by the left edge of the channel 108.

When the driving wheel 80 has returned to its home position (FIG. 7(E)) the ball 94 is caught between the left edge of the upper ball recess 108 and the right edge of the lower ball recess 104. Further rotation of the driving wheel 80 will thus cause corresponding rotation of the cap 92 (FIG. 7(F)).

It will be appreciated that, after the driving wheel 80 has moved to a position where the upper ball channel 108 no longer overlies the pocket 102, the ball 94 can no longer return to the pocket. Accordingly, electromagnetic attraction of the ball 94 is no longer required and the electromagnetic 84 can therefore be de-energised. The motor 40 is preferably provided with a home sensor to control the stopping and starting of the motor, this home sensor indicating when the driving wheel 80 reaches its home position (FIG. 7(E)). This therefore is a convenient signal to use to turn off the electromagnet 84.

FIG. 7(G) shows the state of the clutch after the driving wheel 80 has completed two revolutions, and the cap 92 has completed a single revolution, resulting in the dispensing of a single coin. If any further coins are to be dispensed from the same container, the driving wheel 80 continues to rotate, each further rotation causing a single rotation of the cap and thus the dispensing of a single further coin.

Assuming that the dispensing operation is completed, the clutch then needs to be disengaged. This operation is performed in stages 7(H) to 7(K). At stage 7(H), the driving wheel 80 is caused to rotate in the opposite direction R (to the right as shown in the drawing). When the pocket 102 moves underneath the upper ball channel 108, the ball 94 is free to drop into the pocket, thus causing the clutch to become disengaged. This is facilitated by forming the lower ball recess 104 as a ramp extending upwardly away from the pocket 102, and by using, as a coupling member, a ball 94 which can roll down this ramp. FIGS. 7(H) and 7(I) show the ball 94 moving towards and then being located in the pocket 102. Although these features are preferable, they are not essential because continued movement of the driving wheel 80 would result in the right edge of the upper ball recess 108 pushing the ball 94 into the pocket 102, thus ensuring disengagement of the clutch.

FIGS. 7(J) and 7(K) show the state of the clutch as the drive gear moves towards and then reaches its home position, so the clutch is back in the state shown in FIG. 7(A).

The arrangement described above is preferably provided with the following features in order to improve performance and reliability:

(a) Referring to FIG. 8, the upper ball channel 108 may have a radiused or inclined surface at the right end, as indicated at 110, so as to provide a camming action on the ball 94 to ensure that it is moved back into the pocket 102 when the clutch is disengaged.

(b) The opposite end of the upper ball channel 108 may be radiused at 112 so as to form a greater area of contact with the ball 94 and thus reduce wear.

(c) The right end of the lower ball channel 104 may be formed with a radius of curvature which is smaller than the radius of the ball 94, so that, as indicated at 114 in FIG. 7(F), there is a small area of contact with the ball 94 and thus less chance of sticking.

It will be noted from the description set out above that the drive wheel 80 has to be rotated n+1 times in order to dispense n coins, almost the entire initial rotation being performed before the cap 92 becomes drivingly engaged. This means that the driving wheel 80 is moving at speed before any significant load is applied, thus further enhancing performance.

As indicated above, in order to engage the clutch the electromagnet 84 needs to be energised only for a part of the time that the coin dispensing operation takes place. In the particular embodiment described above, for convenience, the electromagnet is energised for the whole of the initial rotation of the driving wheel 80. However, this is not essential, so long as the electromagnet is energised at a time when the pocket 102 is below the upper ball channel 108 (FIG. 7(C)).

The upper ball channel 108 has a length which is substantially longer than the corresponding dimension of the coupling member, i.e. the diameter of the ball 94, so that there is a significant range of angular positions when the ball can move out of the pocket 102 into the upper ball recess 108, which ensures that this is done reliably. Also, the lower ball channel 104 has a length which is substantially greater than the corresponding dimension of the coupling member 94, so that in the driving position shown in FIG. 7(E), the ball is substantially displaced from the location of the pocket 102 and thus it is ensured that the clutch is reliably engaged. As a result of the inclination of the lower ball channel 104, the channel 104 has a relatively wide mouth so the ball can readily enter the channel 104 even if there is a degree of bouncing following energisation of the electromagnet. Also, because of the ramp, any manufacturing inaccuracies are unlikely to interfere with the ball moving from the pocket 102 into the driving state shown in FIG. 7(E). On the other hand, the close confinement of the ball when in the driving state is valuable, because it ensures that the driving force is transmitted through the ball diameter, avoiding a shearing action.

If it is found that vibration might cause the ball 94 to lift out of the pocket 102, thus erroneously engaging the clutch, this can be avoided by providing a permanent magnet to keep the ball within the pocket, the electromagnet 84 having sufficient energy to overcome the force of the permanent magnet.

The embodiment described above has been presented merely by way of example and may be modified in a number of ways. For example, the arrangement may be reversed so that the pocket 102 and/or the ramp is/are formed in the driven member, rather than the driving member. The control system 38 may be arranged to operate the clutches so that multiple coins are dispensed from different containers simultaneously, if the actuator has sufficient power, or may be arranged so that at any given time only a single clutch is engaged.

What is claimed is:

1. Apparatus for dispensing currency units, the apparatus comprising:
    a cash store for storing a plurality of currency units;
    a dispensing actuator; and
    a clutch having a driving member which is driven by the actuator, a driven member which can move to cause a currency unit to be dispensed from the cash store, a coupling member which can cause a driving force to be transmitted from the driving member to the driven member depending upon whether the coupling member is in an engaged state or a disengaged state, and an electromagnet for moving the coupling member from one of the states to the other state.

2. Apparatus as claimed in claim 1, wherein the electromagnet is arranged to move the coupling member from its disengaged state to its engaged state.

3. Apparatus as claimed in claim 1, wherein the coupling member is operable, when in its engaged state and when the driving member is movable in a first direction, to couple the driving force to the driven member, and wherein the coupling member is arranged to move to its disengaged state in response to the driving member moving in a second direction opposite to the first direction.

4. Apparatus as claimed in claim 1, wherein the coupling member is prevented from moving into a first of its states in dependence upon the relative positions of the driving and driven members, whereby the electromagnet can be operated in order to shift the coupling member from the first state to the other state, and then released without the coupling member returning to its first state.

5. Apparatus as claimed in claim 1, wherein the coupling member is located in a recess in one of the driving and driven members, the recess having first and second parts, the coupling member when in the first part of the recess being in the disengaged state and when in the second part of the recess being in the engaged state.

6. Apparatus as claimed in claim 5, wherein the recess has a length, in the direction of movement of the members, which is substantially greater than the corresponding dimension of the coupling member, so that the coupling member is substantially displaced from the first part of the recess while it is transmitting driving force to the driven member.

7. Apparatus as claimed in claim 6, wherein the driving member and the driven members are configured such that the coupling member is progressively more confined therebetween as it moves towards the position in which it transmits the driving force.

8. Apparatus as claimed in claim 1, wherein the coupling member is configured such that it can roll between its disengaged and engaged states.

9. Apparatus as claimed in claim 8, wherein the coupling member is substantially spherical.

10. Apparatus as claimed in claim 1, wherein the driving and driven members are mounted for rotational movement.

11. Apparatus as claimed in claim 10, wherein the driving and driven members are mounted for rotational movement about a common axis.

12. Apparatus as claimed in claim 1, wherein the coupling member is movable from one state to the other under the influence of the electromagnet and from the other state to said one state under the influence of gravity.

13. Apparatus as claimed in claim 1, comprising a plurality of cash stores having respective clutches and a common actuator.

14. Apparatus as claimed in claim 1, suitable for dispensing coins.

15. Apparatus for dispensing currency units, the apparatus comprising:

a cash store for storing a plurality of currency units;

a dispensing actuator; and a clutch having a driving member which is driven by the actuator, a driven member which can move to cause a currency unit to be dispensed from the cash store, and a coupling member which can be moved from a disengaged state to an engaged state in which a driving force is transmitted from the driving member to the driven member;

wherein, after the coupling member leaves a first of said states, the driving member and driven member move relative to each other to a position preventing the coupling member from returning to said first state.

16. Apparatus as claimed in claim 15, wherein said first state is the disengaged state, the driving member is arranged to move in a first direction while the coupling member is in its engaged state to cause a currency unit to be dispensed, and the coupling member is arranged to move to its disengaged state in response to the driving member moving in a second direction opposite to the first direction.

17. Apparatus for dispensing currency units, the apparatus comprising:

a cash store for storing a plurality of currency units;

a dispensing actuator; and a clutch having a driving member which is driven by the actuator, a driven member which can move to cause a currency unit to be dispensed from the cash store, and a coupling member located in a recess in one of said driving and driven members, the coupling member being movable from a disengaged state, in which it is located in a first part of the recess, and an engaged state in which it is located in a second part of the recess and in which a driving force is transmitted from the driving member to the driven member, the first and second parts of the recess being separated by a distance substantially greater than the corresponding dimension of the coupling member.

* * * * *